Oct. 3, 1961

L. TROY 3,002,742

VEHICLE SUSPENSION SYSTEM

Filed April 20, 1960

INVENTOR
Leonard Troy

BY Samuel Meerkreebs
ATTORNEY

Oct. 3, 1961   L. TROY   3,002,742
VEHICLE SUSPENSION SYSTEM
Filed April 20, 1960   2 Sheets-Sheet 2

INVENTOR
*Leonard Troy*
BY Samuel Meerkreebs
ATTORNEY ized. 3,002,742
Patented Oct. 3, 1961

3,002,742
VEHICLE SUSPENSION SYSTEM
Leonard Troy, 5 Pen-Y-Bryn Drive, Scranton, Pa.
Filed Apr. 20, 1960, Ser. No. 23,563
3 Claims. (Cl. 267—38)

This invention relates generally to the suspension of vehicles and more particularly to an improved vehicle spring suspension which is readily and economically manufactured, easily installed and maintained and highly practical and satisfactory for the purposes intended.

A primary object of the invention is to provide a novel spring suspension for a vehicle wherein a spring is connected to wheel spindles to afford optimum camber.

A still further object of the invention is to provide a novel spring suspension of the character involved which eliminates the use of radius rods, shackles, "wish bones" and other more complicated and expensive suspension parts.

Other objects and the nature and advantages of the instant invention will be apparent from the following description of a preferred embodiment taken in conjunction with the accompanying drawings wherein.

Figure 1:
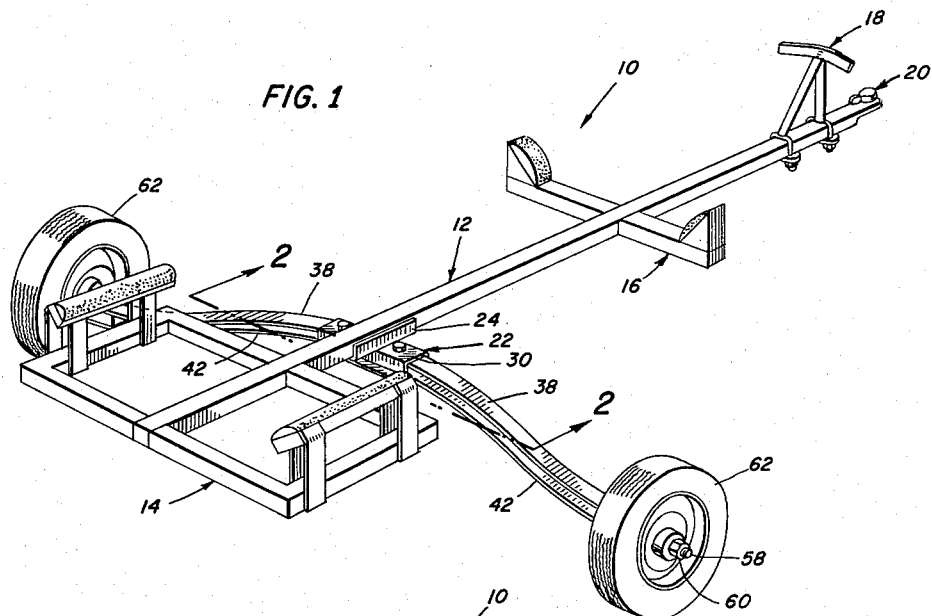
FIGURE 1 is a perspective view of a boat trailer showing by way of example the novel spring suspension of a preferred embodiment of the invention.

Referring to the drawings in detail, a boat trailer is indicated generaly at 10 and includes a central, preferably hollow longitudinal support beam 12 having suitably mounted thereon hull supports 14, 16, 18 and a hitch 20 which per se are typical and form no part of the invention.

The beam 12 has secured to an intermediate portion thereof a spring mounting assembly indicated generally at 22, see FIGURES 1-6. The assembly 22 includes a mounting shoe 24 having a U-shaped cross section and being secured to the beam by longitudinal welds 26 along the upper edges thereof. Extending transversely beneath the mounting shoe 24 by means of welds 28 is a mounting-channel element 30 having a "hat-shaped" cross section. The upper web 32 of the mounting-channel element 30 is transversely apertured and receives spaced mounting nut-and-bolt assemblies 34, 35 therethrough. Juxtaposed beneath the web 32 within the channel 36 of the mounting-channel element 30 is an upper leaf spring element 38 spaced by an intermediate apertured rectangular spacer block element 40 from a lower leaf spring element 42 beneath which is disposed a clamp plate 44, the leaf spring elements 38, 42 and block and clamp plate elements 40, 44 all including aligned apertures through which the nut-and-bolt assemblies 34, 35 extend.

The leaf springs are indicated as extending transversely beneath the beam 12, however, it is contemplated, although not shown, that the spring elements could comprise laterally extending pairs of overlying spring elements terminating at the longitudinal beam.

Figure 7:
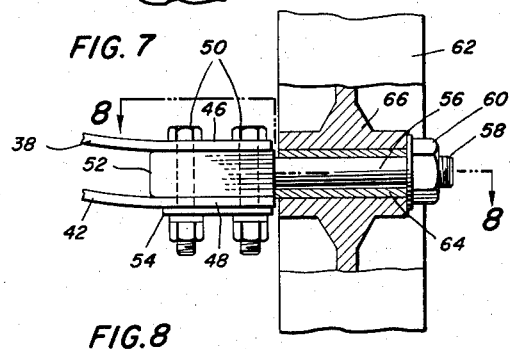
FIGURE 7 is an enlarged fragmentary elevational view of the right hand portion of FIGURE 2 with portions broken away for clarity.
Figure 6:
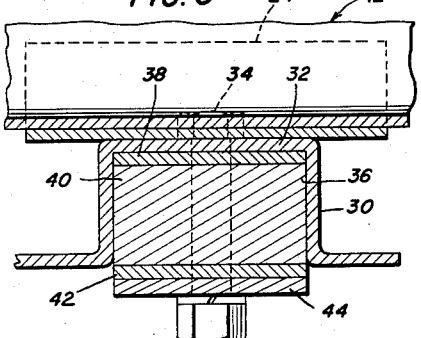
FIGURE 6 is a vertical section taken on line 6—6 of FIGURE 5; with portions broken away for clarity.
Figure 8:
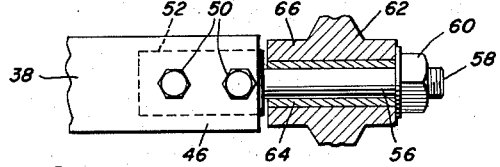
FIGURE 8 is a fragmentary top plan view of FIGURE 7.

The leaf spring elements 38, 42, in the preferred form, have a downwardly curved, semi-ellipical configuration, and the respective overlying terminal ends 46, 48 (see FIGURES 7, 8) are transversely apertured and receive therethrough nut-and-bolt assemblies 50 extending through an intermediate apertured spindle block 52 and a lower clamp plate 54.

The spindle block 52 has an integral lateral wheel spindle 56, terminally threaded at 58 to receive a nut 60 thereon, which retains a wheel 62 thereon. Bearings 64 of any suitable character are received on the spindle and engage the hub 66 of the wheel.

Figure 9:
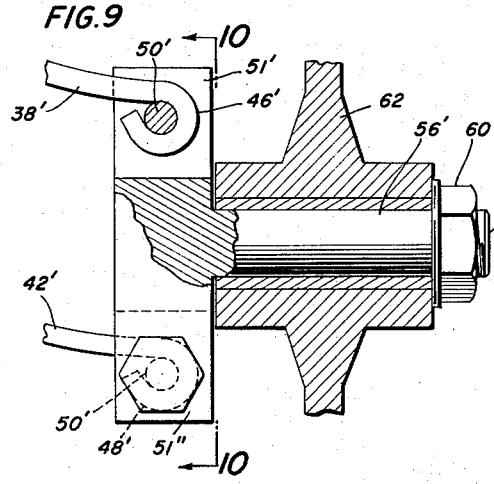
FIGURE 9 is an enlarged fragmentary elevational view similar to FIGURE 7, showing another embodiment of wheel spindle connection with the spring, with portions broken away for clarity.
Figure 10:
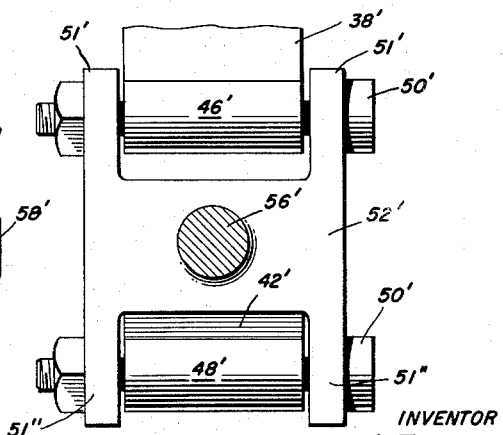
FIGURE 10 is a fragmentary sectional view taken substantially on line 10—10 of FIGURE 9.

Considering FIGURES 9 and 10, the leaf springs are indicated at 38', 42' and the ends terminate in reverse bend sleeve portions 46', 48', respectively. A wheel spindle 56' includes upper and lower spaced ears 51', 51", respectively, which are transversely apertured and receive therethrough suitable support shaft assemblies 50' upon which the sleeves 46', 48' are journaled. The block terminates in a lateral wheel spindle 56', terminally threaded at 58' and receiving a nut 60 which retains the wheel 62 thereon.

The springs 38 and 42 or 38' and 42' are manufactured to have the same deflection characteristics, however, the upper and lower springs could be so manufactured that the relative deflection characteristics differ.

Figure 2:
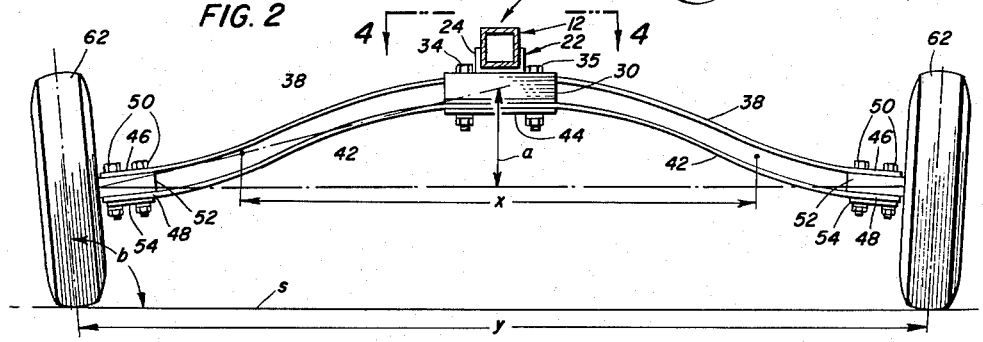
FIGURE 2 is a vertical section taken immediately to the rear of the spring suspension of FIGURE 1 substantially on the plane of line 2—2 of FIGURE 1, showing substantially diagrammatically the "no load" condition of the trailer.
Figure 3:
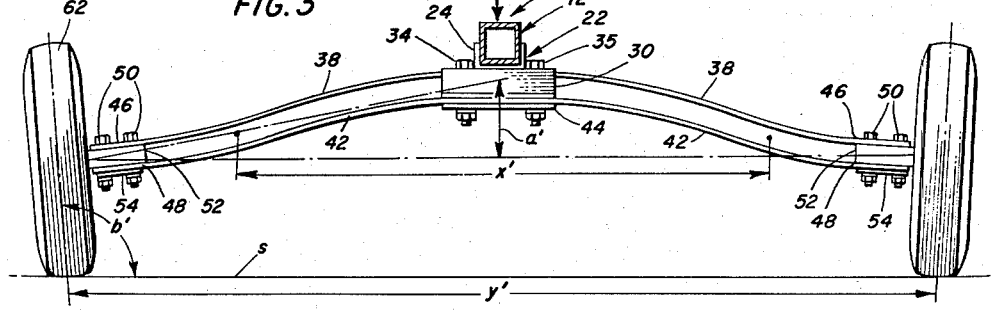
FIGURE 3 is a view similar to FIGURE 2 illustrating the relative position of the parts during a "load" condition of the trailer and especially illustrating the manner in which the optimum camber is maintained.
Figure 4:
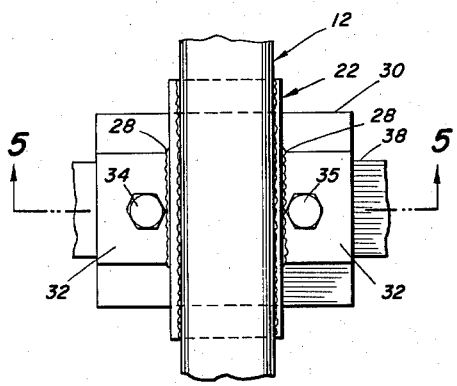
FIGURE 4 is an enlarged fragmentary plan view taken substantially on line 4—4 of FIGURE 2.
Figure 5:
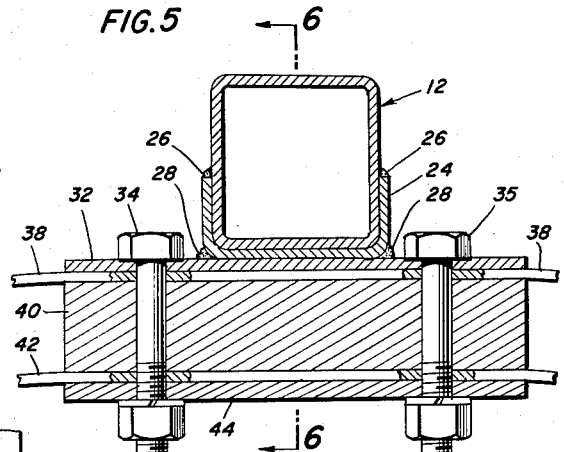
FIGURE 5 is a further enlarged vertical section taken on line 5—5 of FIGURE 4.

Considering FIGURES 2 and 3, when the springs 38, 42 or 38', 42' are used, in the unloaded condition of FIGURE 2, the wheels 62 will have a predetermined camber angle $b$ relative to a support surface S. The springs 38, 42 in a normal unloaded state will maintain a distance $a$ between a theoretical line drawn through the center lines of the wheels and center of block element 40 on the vertical axis thereof. The portion of the springs 38, 42 designated at $x$ will afford substantially all the deflection due to a loaded condition and thus when a load L is applied to the beam 12 as illustrated in FIGURE 3, the camber angle $b'$ will be substantially the same angle $b$ during an unloaded condition, however the distance $a'$ will be less and the distance $x'$ will be longer than $x$ due to the flattening out or straightening of the springs due to the load. It will be observed that the straightening of the springs, which have the same deflection characteristics would result in a slightly greater wheel span $y'$ in FIGURE 3 as compared with $y$ in FIGURE 2.

This maintaining of the camber angle appears to result from the apparently negligible deflection outwardly of the theoretical distances $x$, $x'$ and thus there is afforded a camber angle $b$ to $b'$ which gives optimum riding qualities and minimum tire wear.

In view of the fact that the springs 38, 42 and 38', 42' can be manufactured to have different characteristics, i.e. one would flatten out a greater distance than the other for a given loading, it is possible to alter the camber angle over a particular range depending upon designed loading conditions of the vehicle frame.

Although the spring suspension has been disclosed relative to a boat trailer having a single longitudinal beam, the novel suspension system is equally adaptable in motor vehicles, such as compact cars, particularly for the rear suspension of a front wheel drive vehicle, and also appears to be practical for the drive axle or a steering axle.

Considering FIGURES 2 and 3, in FIGURE 2 the boat trailer 10 is disclosed in an unloaded condition and the distance $a$ between the center of the assembly 22 and a line drawn between the center lines of the spindle blocks 52 in FIGURE 2 will be greater than the distance $a'$ of the same fully loaded trailer in FIGURE 3. The leaf springs 38, 42 will be calibrated for a particular weight and serve as the axle of the trailer and during the unloaded condition of FIGURE 2 the wheels 62 will be disposed at an angle $b$, substantially equal to 90 degrees and the curvature of the springs 38, 42 will be greater than that shown in FIGURE 3 yet the angle $b'$ will still be substantially 90 degrees even though curvature of the springs will be less pronounced as the trailer is loaded. When the trailer is either loaded or unloaded, the camber angle from $b$ to $b'$ will be substantially the optimum angle for attaining best riding qualities.

The construction shown embodies the invention in its preferred form, however, it is intended that the disclosure be illustrative rather than defiinitive, the scope of the invention being defined in the appended claims.

What is claimed as new is as follows:

1. A vehicle spring-and-axle combination comprising a pair of transverse, elongated, single leaf springs having an intermediate, downwardly opening concavo-convex curvature and terminal reverse-bend curvatures, terminal and central spacer blocks secured between said single leaf springs and maintaining them in substantial parallel relation, and axles projecting laterally from said terminal blocks, beyond and in the longitudinal direction of said leaf springs, said axles being disposed at a fixed acute angle with respect to a horizontal plane and providing a constant wheel camber between maximum loaded and unloaded deflection conditions of said springs.

2. A vehicle spring-and-axle combination comprising a pair of transverse, elongated, single leaf springs having an intermediate, downwardly opening concavo-convex curvature and terminal reverse-bend curvatures, terminal and central spacer blocks secured between said single leaf springs and maintaining them in substantial parallel relation, and axles projecting laterally from said terminal blocks, beyond and in the longitudinal direction of said leaf springs, said axles being disposed at a fixed acute angle with respect to a horizontal plane and providing a constant wheel camber between maximum loaded and unloaded deflection condition of said springs, said terminal spacer blocks being formed integral with said axles.

3. A vehicle spring-and-axle combination comprising a pair of transverse, elongated, single leaf springs having an intermediate, downwardly opening concavo-convex curvature and terminal reverse-bend curvatures, terminal and central spacer blocks secured between said single leaf springs and maintaining them in substantial parallel relation, axles projecting laterally from said terminal blocks, beyond and in the longitudinal direction of said leaf springs, said axles being disposed at a fixed acute angle with respect to a horizontal plane and providing a constant wheel camber between maximum loaded and unloaded deflection conditions of said springs, a channel element extending over said springs and central spacer block, and a beam secured normal to said channel element.

References Cited in the file of this patent

UNITED STATES PATENTS

| | | |
|---|---|---|
| 1,538,494 | Tucker | May 19, 1925 |
| 2,458,548 | Aronson | Jan. 11, 1949 |
| 2,534,722 | Meiklejohn et al. | Dec. 19, 1950 |
| 2,615,710 | Lyman | Oct. 28, 1952 |

FOREIGN PATENTS

| | | |
|---|---|---|
| 541,215 | Germany | Jan. 12, 1933 |
| 1,102,041 | France | Apr. 27, 1955 |